UNITED STATES PATENT OFFICE.

JOSIAH S. ELLIOTT, OF CHELSEA, AND JOHN F. WOOD, OF EVERETT, MASS.

IMPROVEMENT IN COMPOSITION-STONE FRAMES FOR HOT-AIR REGISTERS.

Specification forming part of Letters Patent No. 126,042, dated April 23, 1872.

SPECIFCATION.

*To all whom it may concern:*

Be it known that we, JOSIAH S. ELLIOTT, of Chelsea, in the State of Massachusetts, and JOHN F. WOOD, of Everett, in said State, have invented an Improvement in Stone-Settings or Frames for Hot-Air Registers; and we do hereby declare the following to be a full and correct description of the same.

Register-stones, or stone-settings, or frames for hot-air registers are usually made of soap-stone, on account of its non-conducting properties, and in many cases are ill-adapted in appearance to the room in which they are used.

Our improvement is in imitation of marble, and in its manufacture we make use either of soap-stone or other suitable natural stone, or of a suitably-prepared artificial stone.

When making use of artificial stone we select materials for the stone (preferably, however, employing mostly soap-stone,) and put them together, molding or tamping them to the required shape in the manner directed in Letters Patent of the United States No. 124,557, granted to us March 12, 1872, for improvement in the manufacture of imitation marble, and afterward marble the stone thus prepared in the manner further indicated in said patent.

When making use of natural stone we select a cheap stone which will take a smooth surface and hold a tolerably good edge, (soap-stone is the best, on account of its being a remarkably good non-conductor of heat,) and having cut it to the required form marble it substantially in the manner that we marble artificial stone, excepting that we use scarcely any oil in the preparation of the pigments.

We claim—

As a new article of manufacture, a register stone in imitation of marble, prepared substantially as described.

J. S. ELLIOTT.
JNO. F. WOOD.

Witnesses:
WILLIAM W. SWAN,
JOHN F. BRENNAN.